United States Patent
Jankura et al.

(10) Patent No.: US 8,821,823 B2
(45) Date of Patent: *Sep. 2, 2014

(54) DRY SORBENT INJECTION DURING NON-STEADY STATE CONDITIONS IN DRY SCRUBBER

(75) Inventors: Bryan J Jankura, Uniontown, OH (US); Anthony A Silva, Wadsworth, OH (US); Edward J Campobenedetto, Medina, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,150

(22) Filed: Jul. 12, 2012

(65) Prior Publication Data
US 2013/0156665 A1   Jun. 20, 2013

Related U.S. Application Data

(60) Provisional application No. 61/540,806, filed on Sep. 29, 2011.

(51) Int. Cl.
*B01D 53/50* (2006.01)
*F23J 15/02* (2006.01)
*B01D 53/80* (2006.01)

(52) U.S. Cl.
CPC ...... *B01D 53/508* (2013.01); *B01D 2258/0283* (2013.01); *B01D 2251/404* (2013.01); *F23J 15/02* (2013.01); *F23J 2219/60* (2013.01); *F23J 2217/101* (2013.01); *B01D 2251/604* (2013.01); *B01D 53/80* (2013.01); *B01D 53/505* (2013.01)
USPC .................................. 423/244.07; 423/244.08

(58) Field of Classification Search
USPC ......................................... 423/244.07, 244.08
See application file for complete search history.

(56) References Cited

U.S. PATENT DOCUMENTS

| | | | | |
|---|---|---|---|---|
| 4,645,653 A | * | 2/1987 | Kimura | 423/235 |
| 5,084,256 A | * | 1/1992 | McElroy et al. | 423/243.08 |
| 5,814,288 A | * | 9/1998 | Madden et al. | 423/244.01 |

* cited by examiner

*Primary Examiner* — Timothy Vanoy
(74) *Attorney, Agent, or Firm* — Eric Marich (57) ABSTRACT

Methods of reducing emissions levels during upset periods such as startup are disclosed for use with a dry scrubber desulfurization system. A dry calcium hydroxide powder is injected into the gas flowpath and hydrated in the spray dryer absorber. The resulting hydrated powder is then deposited on the filter bags in the baghouse. This can be done at lower temperatures than the spray dryer absorber would otherwise be operable, enabling desulfurization to occur earlier in the combustion process, such as during startup of a cold combustion system at ambient temperature. The operation of the combustion system can also be backed up, made up, trimmed, or augmented depending on various operating scenarios.

24 Claims, 7 Drawing Sheets

DRY SORBENT INJECTION DURING NON-STEADY STATE CONDITIONS IN DRY SCRUBBER

CROSS-REFERENCE TO RELATED APPLICATIONS

This application claims priority to U.S. Provisional Patent Application Ser. No. 61/540,806, filed on Sep. 29, 2011. The disclosure of this application is hereby fully incorporated by reference in its entirety.

BACKGROUND

The present disclosure generally relates to the removal of particulates and other contaminants from flue gas produced during combustion using a dry scrubber flue gas desulfurization system during startup, shutdown, malfunction, and other upset periods. In particular, this disclosure relates to new and useful methods and systems for capturing sulfur dioxide ($SO_2$), sulfur trioxide ($SO_3$), HCl, and other acid gases by injecting dry sorbent into a gas stream and preferably passing the gas stream through a spray dryer absorber to disperse the sorbent in a baghouse prior to the use of a pollutant-forming fossil fuel in a combustion system or during non-steady state operating conditions.

During combustion, the chemical energy in a fuel is converted to thermal heat, which can be used in various forms for different applications. The fuels used in the combustion process include a wide range of solid, liquid, and gaseous substances, including coal, oil (diesel, No. 2, Bunker C or No. 6), natural gas, wood, tires, biomass, etc.

Combustion transforms the fuel into a large number of chemical compounds. Water ($H_2O$) and carbon dioxide ($CO_2$) are the primary products of complete combustion. However, other combustion reactions with chemical components in the fuel result in undesirable byproducts. Depending on the fuel used, such byproducts may include particulates (e.g. fly ash), acid gases such as sulfur oxides ($SO_x$) or nitric oxides ($NO_x$), metals such as mercury or arsenic, carbon monoxide (CO), and hydrocarbons (HC). The emissions levels of many of these byproducts are regulated by governmental entities, such as the U.S. Environmental Protection Agency (EPA).

Several different technologies exist for removing such byproducts from the flue gas. In one method, known as spray drying chemical absorption or dry scrubbing, an aqueous alkaline solution or slurry, which has been finely atomized, is sprayed into the hot flue gas downstream of the combustion chamber in which the fuel was combusted. The alkaline reagent reacts with the pollutants, and particulates are formed. The water evaporates and cools the hot flue gas. The exiting cleaned flue gas typically has a moisture content of about 10% to about 15%. The flue gas then travels to a particulate collection device, generally a baghouse, where the particulates are removed from the flue gas, which is then sent to a stack.

When a combustion system, such as a boiler having a furnace, is started up from cold conditions such as ambient temperatures, the furnace usually burns natural gas or diesel (No. 2) oil to "warm up" the boiler before switching over to coal. A furnace temperature of about 400° F. to about 500° F. is needed before coal can start to be burned. Due to various startup conditions and safety requirements, the furnace can be started and stopped several times before attaining steady-state operations. Complete startup can take anywhere from 8 hours to up to 2 days to complete, depending on the problems encountered.

The dry scrubbing desulfurization process does not work well at low temperatures. In particular, the temperature of the flue gas typically needs to be at least 220° F. to use the spray dryer absorber, so that the water can be completely evaporated. During startup, the temperature of the flue gas that passes to the spray dryer absorber may be below this threshold temperature, yet $SO_x$ and other pollutants are still being produced. In addition, the furnace generally reaches the coal operating temperature of 400° F. to 500° F. before the flue gas attains a temperature of 220° F. in the spray dryer absorber. This results in higher $SO_x$ emissions during startup. In addition, the baghouse generally requires 30 to 60 minutes of operation after the spray dryer absorber has started to accumulate significant alkaline material and achieve significant $SO_2$ removal.

Previously, emissions regulations did not cover "upset" periods such as startup, shutdown, and malfunction. However, it would be desirable to reduce such emissions due to increasing regulatory restrictions. Methods that can reduce such emissions during startup would be very helpful.

BRIEF DESCRIPTION

Disclosed herein are various methods and systems for reducing $SO_x$ emissions during non-steady state operating conditions such as startup, shutdown, or malfunction in a pollution control system that uses a dry scrubber for desulfurization. Briefly, a dry calcium hydroxide powder is injected into the flue gas while the combustion chamber is still at a temperature below normal operating temperature, such as when the combustion chamber is warming up, and/or the spray dryer absorber is below its threshold temperature of 220° F. The powder is injected into the system, preferably upstream of the spray dryer absorber. The resulting calcium hydroxide powder is then collected in a downstream baghouse to form a filter cake that is useful in reducing $SO_x$ emissions.

Disclosed in embodiments is a method for reducing combustion emissions during upset periods in a combustion system, such as startup of the combustion chamber in the combustion system. The combustion system has a gas flowpath that extends from a combustion chamber through a spray dryer absorber to a baghouse downstream of the spray dryer absorber. A carrier gas (which may be flue gas) flows through the gas flowpath. A dry calcium hydroxide powder is mixed into a transport gas, typically air, and is pneumatically conveyed to an injection location downstream of the combustion chamber and upstream of the baghouse where the dry calcium hydroxide powder is blown into and mixed with the carrier gas (e.g. by injecting) in the gas flowpath. Water is sprayed into the carrier gas in the spray dryer absorber to humidify and reduce the temperature of the carrier gas. The calcium hydroxide powder is deposited in the baghouse to form a filter cake that reduces combustion emissions. The formation of the filter cake occurs without the spraying of a lime slurry in the spray dryer absorber, which can only occur at a temperature over 220° F.

In particular embodiments, no liquid is added to the carrier gas between the injection location and the spray dryer absorber.

The water sprayed into the carrier gas in the spray dryer absorber may come from a recycle system for recycling solids from the baghouse. Because fewer solids are being recycled upon startup, the recycle system may provide either water or a slurry.

Sometimes, the gas flowpath extends through an air preheater located between the combustion chamber and the spray dryer absorber. The injection location can be located between the air preheater and the spray dryer absorber. Alternatively, the injection location is upstream of the air preheater. A particulate collection device may also be located between the air preheater and the spray dryer absorber with the injection location downstream of the particulate collection device.

The injection location can also be between the spray dryer absorber and the baghouse.

The baghouse downstream of the spray dryer absorber may be a pulse jet fabric filter or reverse gas fabric filter.

In some upset conditions, such as malfunction, the water sprayed into the spray dryer absorber may be in the form of simply water (i.e. $H_2O$), or in the form of a lime slurry (i.e. water plus calcium hydroxide). The water can also come from a recycle system for recycling solids from the baghouse, or through auxiliary nozzles when the atomizer is not operating. In some embodiments, the flue gas entering the spray dryer absorber has a temperature of from about 140° F. to about 210° F. Generally, the carrier gas entering the spray dryer absorber has a temperature of from less than 220° F.

The combustion chamber may have a temperature of less than 400° F. In embodiments, the carrier gas is flue gas exiting the combustion chamber, especially during startup of the combustion chamber. However, the methods can also be used during shutdown, i.e. when the temperature of the carrier gas is decreasing over time.

Also disclosed is a method for capturing pollutants in a flue gas produced by a combustion chamber during non-steady state operating conditions. A dry calcium hydroxide powder is mixed into the flue gas at an injection location downstream of the combustion chamber and upstream of a spray dryer absorber. Water is sprayed into the flue gas in the spray dryer absorber to humidify and reduce the temperature of the flue gas. The flue gas is then passed through a baghouse downstream of the spray dryer absorber. The calcium hydroxide powder is deposited in the baghouse to form a filter cake that captures pollutants in the flue gas.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of."

All ranges disclosed herein are inclusive of the recited endpoint and independently combinable (for example, the range of "from 250° F. to 400° F." is inclusive of the endpoints, 250° F. and 400° F., and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

The term "hydrated lime" refers to calcium hydroxide, also known as $Ca(OH)_2$. The term "hydrated" when used here does not mean that molecular water is present.

The term "lime slurry" is used to refer to a mixture of calcium hydroxide with water. Other calcium sorbents include, for example, limestone or quicklime. The term "limestone" refers to calcium carbonate, also known as $CaCO_3$. The term "quicklime" refers to calcium oxide, CaO.

The present disclosure refers to components which are "upstream" and "downstream" of other components. These two terms are relative to another named component. A given component is "upstream" of a named component if a flowpath runs through the given component before running through the named component. Similarly, a given component is "downstream" of a named component if a flowpath runs through the given component after running through the named component.

The present disclosure relates to various methods and systems for reducing $SO_x$ emissions during non-steady state operating conditions (i.e. upset periods or upset conditions) in a pollution control system that uses a dry scrubber for desulfurization. Very generally, a flue gas is generated by a combustion system containing a combustion chamber in which fuel is combusted. A dry calcium hydroxide powder is then injected into the flue gas while the combustion chamber is in a non-steady state operating condition. The powder is injected upstream of the spray dryer absorber. The resulting calcium hydroxide powder is then collected in a downstream baghouse to form a filter cake that is useful in reducing $SO_x$ emissions.

Generally, it is considered that such methods can be used in any system in which combustion occurs. The combustion can be used for any purpose, for example to generate power, produce a certain product, or simply to incinerate a given fuel. Exemplary combustion systems in which the present methods may be applicable include power generation systems that use a boiler having a furnace as the combustion chamber; cement kilns; electric arc furnaces; glass furnaces; smelters (copper, gold, tin, etc.); pelletizer roasters; blast furnaces; coke oven batteries; chemical fired heaters; refinery ovens; and incinerators (medical waste, municipal solid waste, etc.). The term "combustion chamber" is used herein to refer to the specific structure within the system in which combustion occurs.

Figure 1:
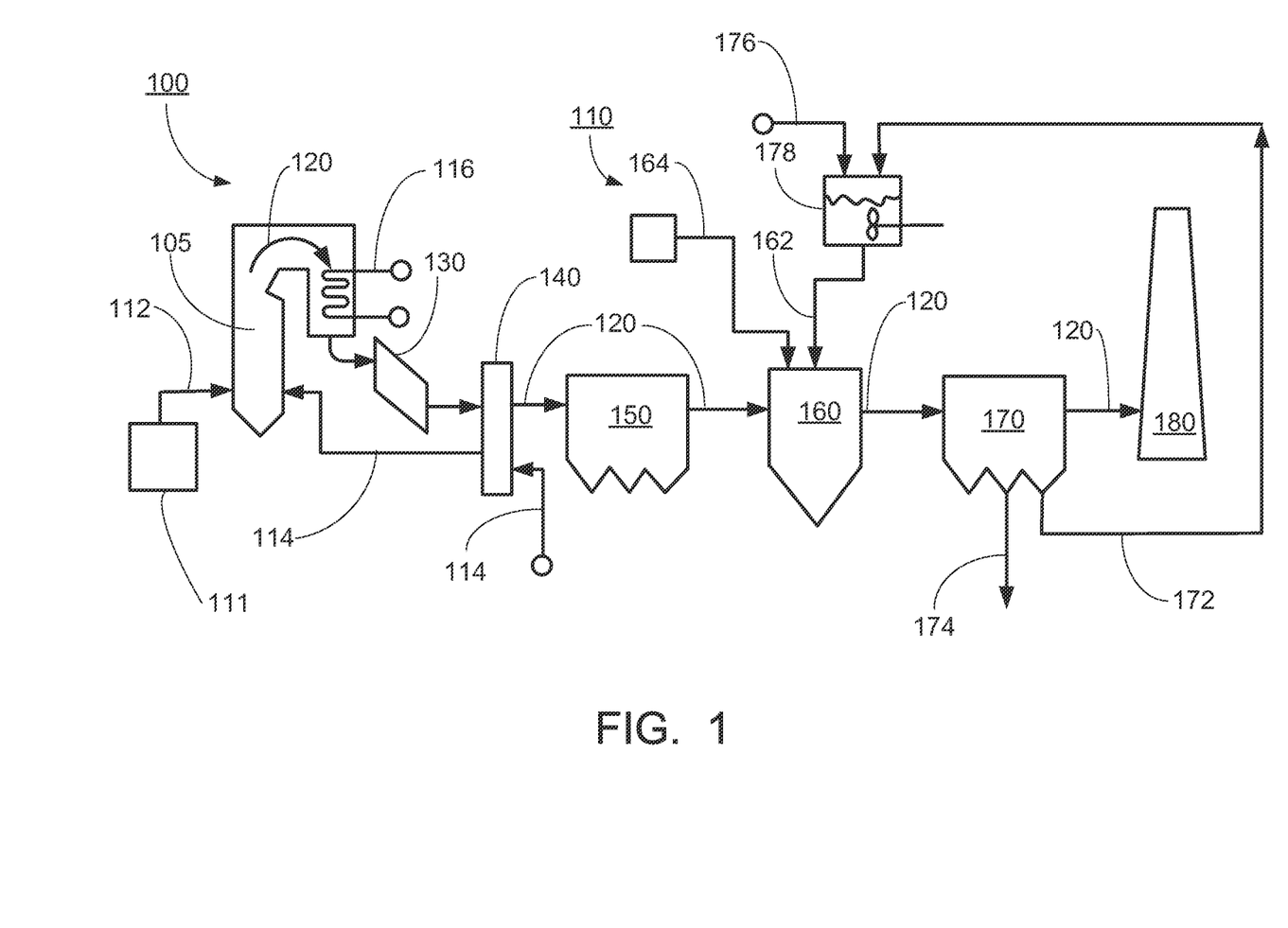
FIG. 1 is a diagram illustrating a conventional boiler with a dry desulfurization system.

FIG. 1 generally illustrates an exemplary power generation system with a boiler 100 and a downstream desulfurization system 110. A fossil fuel 112, such as coal from a pulverizer 111, and air 114 are burned in the furnace 105, resulting in the generation of a flue gas 120. The flue gas 120 passes an economizer 116 used to preheat the water used in the boiler to produce steam and to cool the flue gas 120. Other heat transfer surfaces upstream of the economizer 116 are not shown. The flue gas 120 then enters a selective catalytic reduction (SCR) system 130, which may or may not be present, to remove nitrogen oxides ($NO_x$) from the flue gas 120. Next, the flue gas 120 passes through an air preheater 140 to further cool the flue gas 120 and heat the air 114 entering the furnace 105. After passing through the air preheater 140, the flue gas 120 typically has a temperature of about 250 to about 400° F. (121 to 204° C.). Sometimes the flue gas 120 then passes through a particulate collection device 150 to collect fly ash and other large particles. The flue gas continues into a dry scrubber or spray dryer absorber 160. Here, an atomized alkaline slurry 162 is sprayed into the flue gas to react with sulfur oxides ($SO_x$) and to further cool the flue gas 120 to a range of about 140 to about 210° F. (60 to 99° C.). The water in the slurry is evaporated, and the resulting cleaned and particle-laden flue gas 120 is conveyed to a particulate collection device 170, such as a baghouse or an electrostatic precipitator, to remove the particles from the flue gas 120. The cleaned flue gas 120 is then sent to a stack 180. If desired, a recycle stream 172 from the particulate collection device 170 can be used to collect the alkaline particles from the baghouse and mix them with water 176 in a recycle tank 178 to make the alkaline slurry 162 which is used in the spray dryer absorber 160. Alternatively, fresh slurry 164 can be used in the spray dryer absorber 160. Particles can also be removed from the particulate collection device 170 for disposal, indicated here with reference numeral 174.

Again, the temperature of the flue gas in the spray dryer absorber needs to be at least 220° F. before its desulfurization activity can begin. The only source for heat is the flue gas itself. When the combustion system is cold, or in other words the combustion chamber is at ambient temperature, the temperature in the spray dryer absorber is insufficient. During startup, shutdown, malfunction, or other upset periods, the combustion chamber can produce $SO_x$ and other pollutant emissions while the flue gas is below the 220° F. temperature, and thus the dry scrubber cannot be used for desulfurization or removal of other pollutants. This is an undesirable outcome.

In the methods of the present disclosure, desulfurization activity can occur in the baghouse during periods where the temperature in the spray dryer absorber is too low to use an alkaline slurry. The term "non-steady state operating conditions" is used herein to refer to such periods where the temperature in the spray dryer absorber is below 220° F. (approx. 104° C.). Such conditions can occur during upset periods such as startup, shutdown, and some malfunctions. During such conditions, calcium hydroxide is deposited in the baghouse to provide and enhance high-efficiency removal of acids. In this regard, the flue gas must travel through the filter cake formed on the filter in the baghouse, which provides intimate contact between the flue gas and the alkaline calcium hydroxide product and promotes the absorption of vapor-phase acid gases (such as $SO_x$) in the flue gas by the filter cake. More generally, the present methods can be used to remove particulates from the flue gas.

One non-steady state operating condition contemplated by the present disclosure is during startup of the combustion system. During startup, the combustion chamber and the desulfurization system (including the spray dryer absorber) and the gases inside these components are at ambient temperatures. The temperatures are increased until the combustion chamber reaches its steady-state operating temperature, which can be as high as 1000° F. Put another way, the temperature of the flue gas exiting the combustion chamber is increasing over time during startup.

In addition, during startup while the temperature of the flue gas in the spray dryer absorber is rising to its steady-state operating temperature, only a limited amount of calcium hydroxide can be atomized into the flue gas through the atomizer in the spray dryer absorber. This is because at lower flue gas temperatures, less water is required to cool the flue gas, and this cooling should not completely saturate the flue gas. In addition, there is a practical limit to the amount of alkaline sorbent in any slurry because the alkaline slurry typically experiences high viscosity once the slurry is in the range of about 25% to about 35% solids and this causes pumping problems that limit the injection rate of alkaline sorbent through the atomizer. Adding dry calcium hydroxide powder into the flue gas upstream of the spray dryer absorber avoids this viscosity problem. The necessary alkalinity can be added to the flue gas without the water component of the slurry that must be evaporated. It should be noted that water can still be added, by means other than the atomizer for evaporation, and be carried over to the baghouse.

Another non-steady state operating condition contemplated by the present disclosure is during shutdown of the combustion system. During shutdown, the temperature of the combustion chamber is intentionally decreased from the steady-state operating temperature down to ambient temperatures. Put another way, the temperature of the flue gas exiting the combustion chamber is decreasing over time during shutdown. It should be noted that one reason for shutdown can be for maintenance purposes, such as to clean and replace the filter bags used in the baghouse itself. The filter cake present on the filter bags can be responsible for the removal of as much as 63% of the $SO_2$ entering the baghouse. After cleaning or replacement though, this desulfurization ability is absent until the filter cake is rebuilt. Under the methods of the present disclosure, the filter cake can be rebuilt earlier and faster than waiting for the spray dryer absorber to become available to spray alkaline slurry, which results in desulfurization ability being recovered more quickly and reducing overall emissions more quickly. The goal is to precoat the filter bags with the calcium hydroxide before flue gas emissions exit the desulfurization system.

A third non-steady state operating condition contemplated by the present disclosure is during a malfunction of the combustion system which results in the temperature of the gas in the spray dryer absorber being reduced below 220° F. Such a malfunction is generally very severe, considering the large drop in temperature, and differs from shutdown mainly in being unintended and/or not resulting in a drop down to ambient temperatures.

Figure 2:
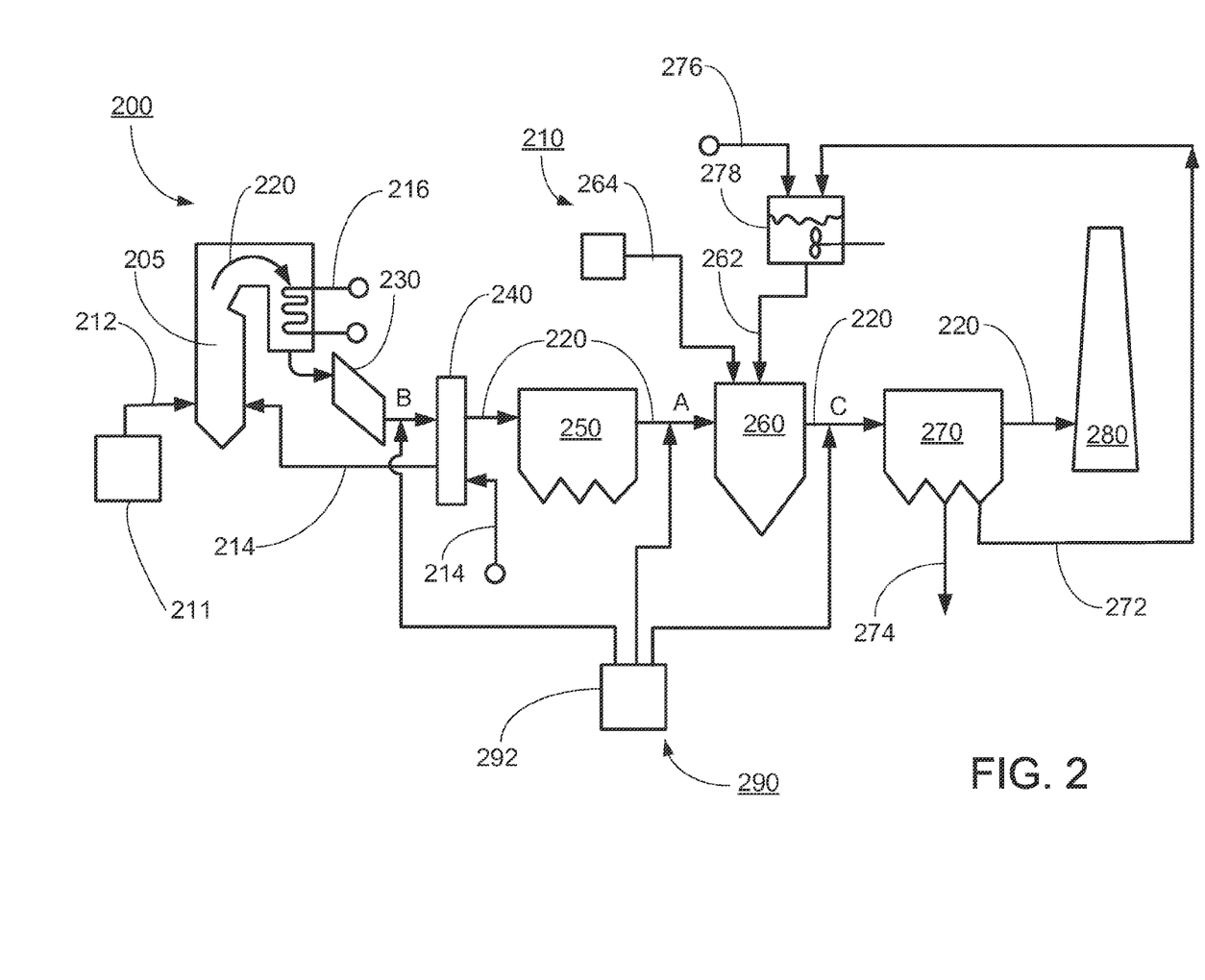
FIG. 2 is a diagram illustrating a combustion system with a dry desulfurization system and a calcium hydroxide powder injection system as described in the present disclosure.

FIG. 2 generally illustrates an exemplary system of the present disclosure having a combustion system 200, a downstream desulfurization system 210, and a dry calcium hydroxide powder injection system 290. Similar to FIG. 1, air 214 and coal 212 from a pulverizer 211 are burned in the combustion chamber 205, resulting in the generation of a flue gas 220. Generally speaking, the flue gas is a carrier gas that travels along a gas flowpath. The flue gas passes an economizer 216 (other heat transfer surfaces upstream of the economizer are not shown) and a SCR system 230 which may or may not be present that removes $NO_x$ from the flue gas. The flue gas passes through an air preheater 240 and continues into the spray dryer absorber 260. If desired, an optional particulate collection device 250 can be located between the air preheater 240 and the spray dryer absorber 260 to collect fly ash and other large particles. In the spray dryer absorber 260, an atomized alkaline slurry 262, such as a lime slurry, is sprayed into the flue gas 220 to clean and cool the flue gas. The resulting cleaned and particle-laden flue gas 220 is conveyed to a baghouse 270 to remove the particles from the flue gas. The cleaned flue gas 220 is then sent to a stack 280. If desired, a recycle stream 272 from the baghouse 270 can be used to collect the unreacted alkaline particles from the baghouse and mix them with water 276 in a recycle tank 278 to make the alkaline slurry 262 which is used in the spray dryer absorber. Alternatively, fresh slurry 264 can be used in the spray dryer absorber 260. Particles from the baghouse can also be disposed of, shown here with reference numeral 274.

The combustion chamber 205 is upstream of the air preheater 240, which is upstream of the spray dryer absorber 260. A baghouse 270 is downstream of the spray dryer absorber 260. Put another way, the spray dryer absorber 260 is located between the air preheater 240 and the baghouse 270. The SCR system 230, if present, is located between the combustion chamber 205 and the air preheater 240.

The present methods contemplate that a gas flowpath 220 is present between the combustion system and the desulfurization system. A carrier gas, such as flue gas or regular air, flows through the gas flowpath. A dry calcium hydroxide powder is injected into the carrier gas at an injection location downstream of the combustion chamber 205 and upstream of the baghouse 270. Water is sprayed into the carrier gas in the spray dryer absorber 260 to cool and humidify the flue gas. The calcium hydroxide powder is then deposited in the baghouse 270 to form a filter cake that is used to reduce the emissions.

The filter cake can be formed prior to the addition of relatively high pollutant-producing fuel (e.g. coal) into the combustion chamber 205, or in other words while a relatively clean fuel (e.g. natural gas) is being used to warm up the combustion chamber. It is contemplated that the calcium hydroxide powder could be injected starting 60 to 90 minutes earlier than the spray dryer absorber 260 could otherwise be started, so alkalinity can be added to coat the baghouse 270 sooner and begin desulfurization earlier. Put another way, the filter cake can be formed before the spraying of water or a slurry (i.e. a lime slurry, a recycle slurry, or combination thereof) in the spray dryer absorber 260 begins.

The dry calcium hydroxide powder injection system 290 includes a calcium hydroxide supply source 292. It is contemplated that calcium hydroxide powder can be injected into the desulfurization system in three different locations A, B, C. These three injection locations are all downstream of the combustion chamber 205 and upstream of the baghouse 270.

In particular, the temperature of the flue gas/carrier gas should be less than 1000° F. to maintain the stability of the hydrated lime.

The first injection location A is downstream of the air preheater 240 and upstream of the spray dryer absorber 260. Put another way, injection location A is between the air preheater 240 and the spray dryer absorber 260. The optional particulate collection device 250 should be upstream of the injection location A. In some embodiments, the flue gas entering the spray dryer absorber (i.e. at injection location A) has a temperature of from about 140° F. to about 210° F., or from about 150° F. to about 200° F., or from about 160° F. to about 170° F.

The second injection location B is downstream of the combustion chamber 205 and upstream of the air preheater 240. The second injection location B may also be described as being downstream of the SCR system 230.

The third injection location C is downstream of the spray dryer absorber 260. Put another way, injection location C is between the spray dryer absorber 260 and the baghouse 270.

Dry calcium hydroxide powder may also be simultaneously injected at the various locations identified above. Referring back to FIG. 2, the water that is sprayed in the spray dryer absorber 260 can come from a separate water source, or in some embodiments can come from the recycle tank 278. During startup, there are few to no solids coming through recycle stream 272, so the stream 262 is essentially water.

The optional particulate collection device 250 may in various embodiments be either an electrostatic precipitator (ESP) or a baghouse. Different types of baghouses are known in the art, for example a reverse gas fabric filter, a shake deflate fabric filter, and a pulse jet fabric filter.

The baghouse 270 downstream of the spray dryer absorber 260 is desirably a pulse jet fabric filter (PJFF) or a reverse gas fabric filter. In this regard, a baghouse is preferable to an ESP at this location due to the desulfurization ability of the baghouse compared to an ESP. In other words, a baghouse can capture pollutants that are in the vapor phase, whereas an ESP only traps particles and does not significantly capture vapor-phase pollutants. Generally, all of the flue gas entering the baghouse 270 should pass through the filter cake so that acid gases such as $SO_2$, $SO_3$, and HCl can be removed.

Figure 3:
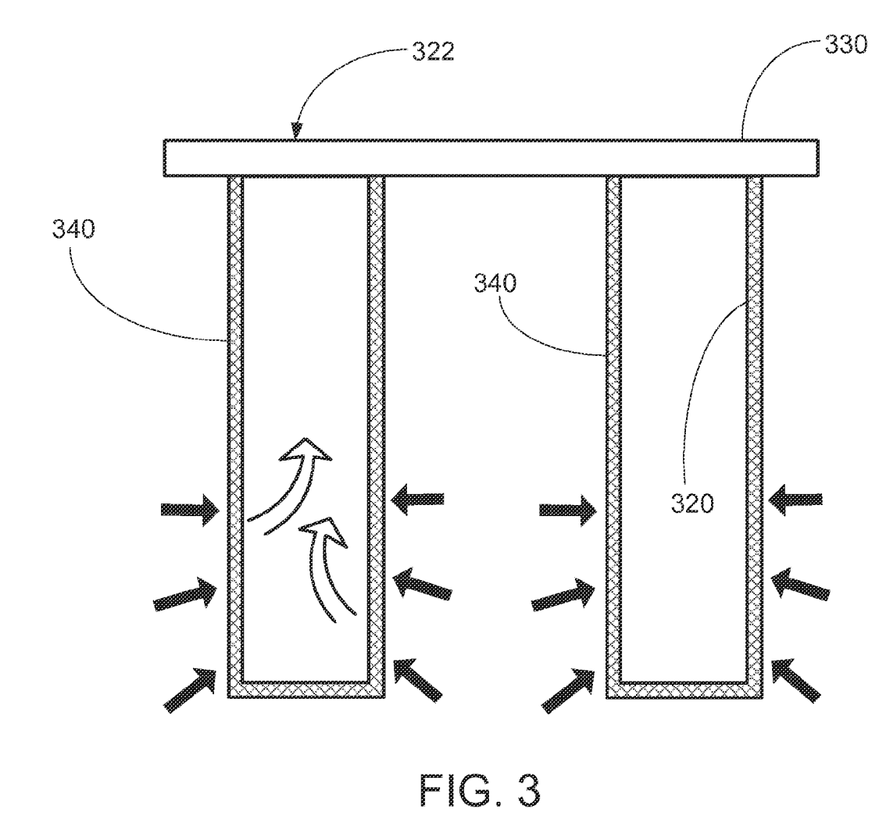
FIG. 3 is an illustration of a filter bag in a pulse jet fabric filter.

FIG. 3 is a schematic illustration of a pulse jet fabric filter. A baghouse generally contains multiple compartments, with each compartment containing up to several hundred long, vertically supported, small diameter fabric bags. In a pulse jet fabric filter (PJFF), the bags 320 hang from a tubesheet 330. The flue gas containing particulates flows from outside the bag (indicated as solid arrows) to inside the bag (indicated as outlined arrows). The flue gas passes through the porous bag material, leaving the particulates behind to form a filter cake 340 on the exterior of the bag. A pulse of compressed air can be directed into the bag from the open top 322, causing a shock wave to travel down the length of the bag and dislodge the filter cake.

Calcium hydroxide is used because its salt is not soluble in water. In contrast, sodium sorbents are generally soluble and thus are less desirable. In addition, calcium hydroxide is safer than quicklime, which gives off heat when combined with water.

Applicants have determined that the reactivity of powdered calcium hydroxide is comparable to the reactivity of calcium hydroxide in a lime slurry. This allows the dry desulfurization system to be operated acceptably in various non-steady state conditions. Here, prior to startup, calcium hydroxide powder can be added before it is possible to introduce lime slurry in sufficient quantity to form a significant filter cake, thus achieving acceptable acid gas emissions much earlier than otherwise possible.

Figure 4:
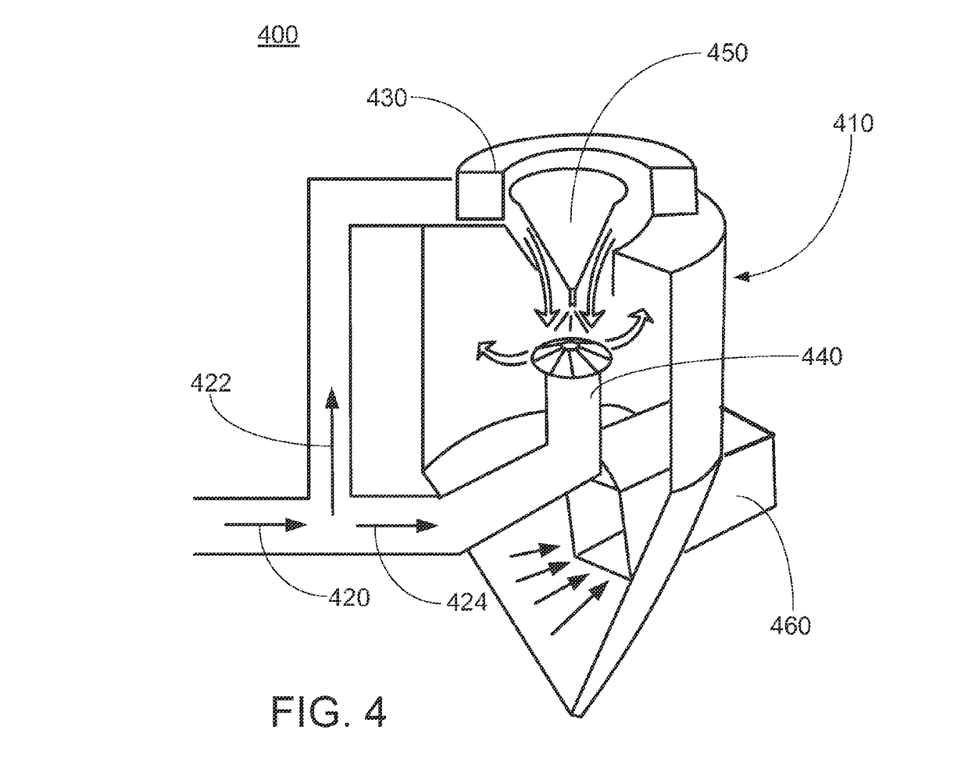
FIG. 4 is a cutaway view of a spray dryer absorber.
Figure 5:
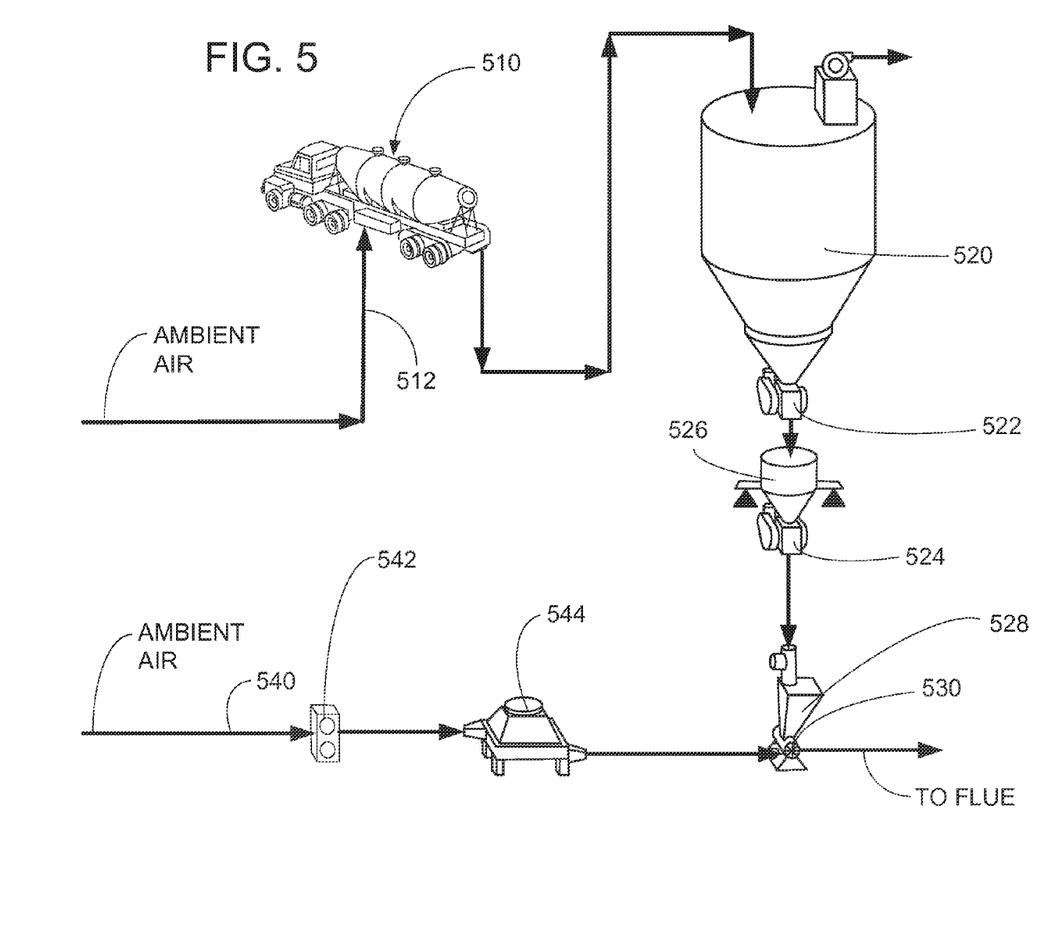
FIG. 5 is an illustration of the major components of a dry sorbent injection system.
Figure 6:
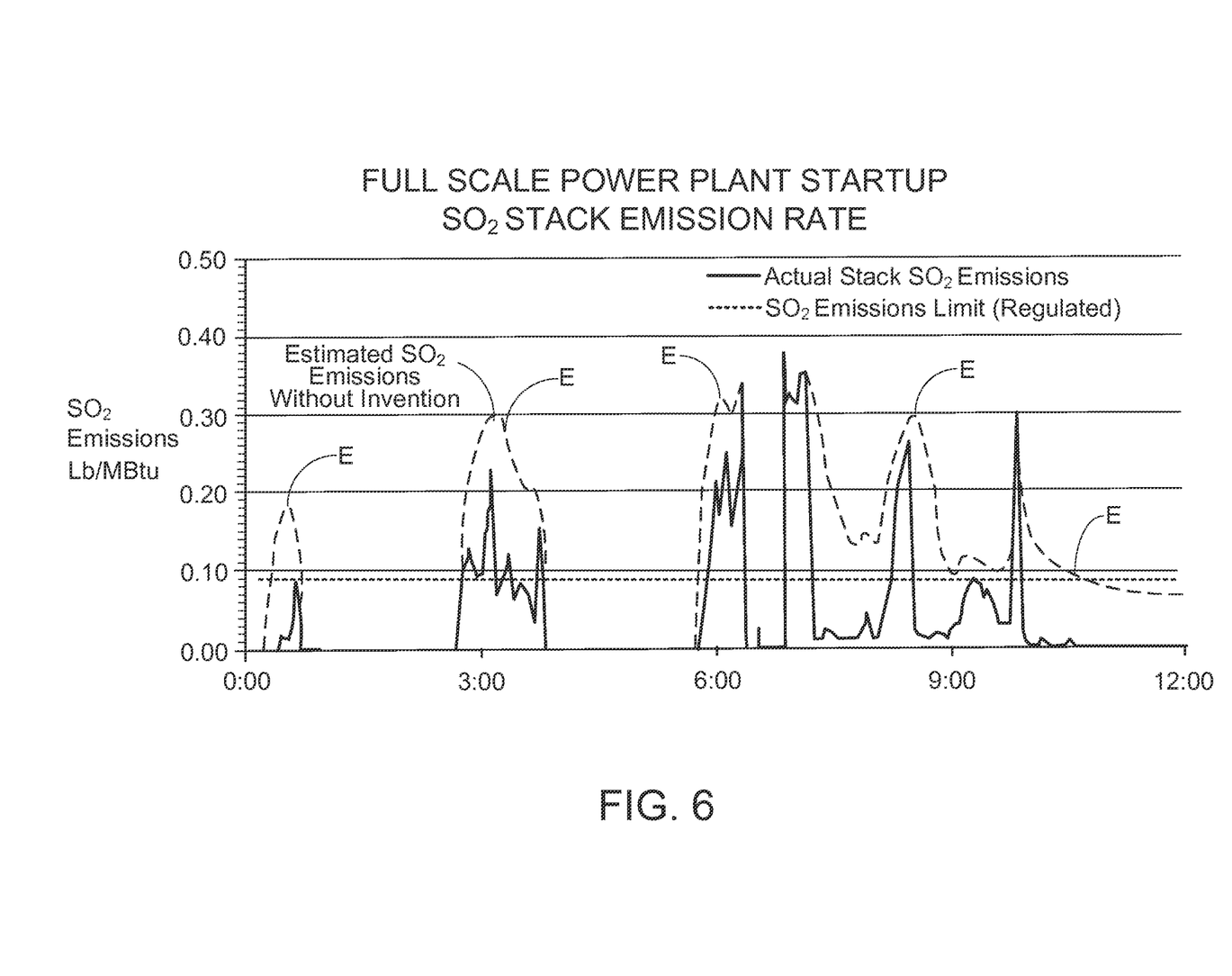
FIG. 6 is an emissions vs. time graph showing actual emissions with calcium hydroxide injection and estimated emissions without calcium hydroxide injection.
Figure 7:
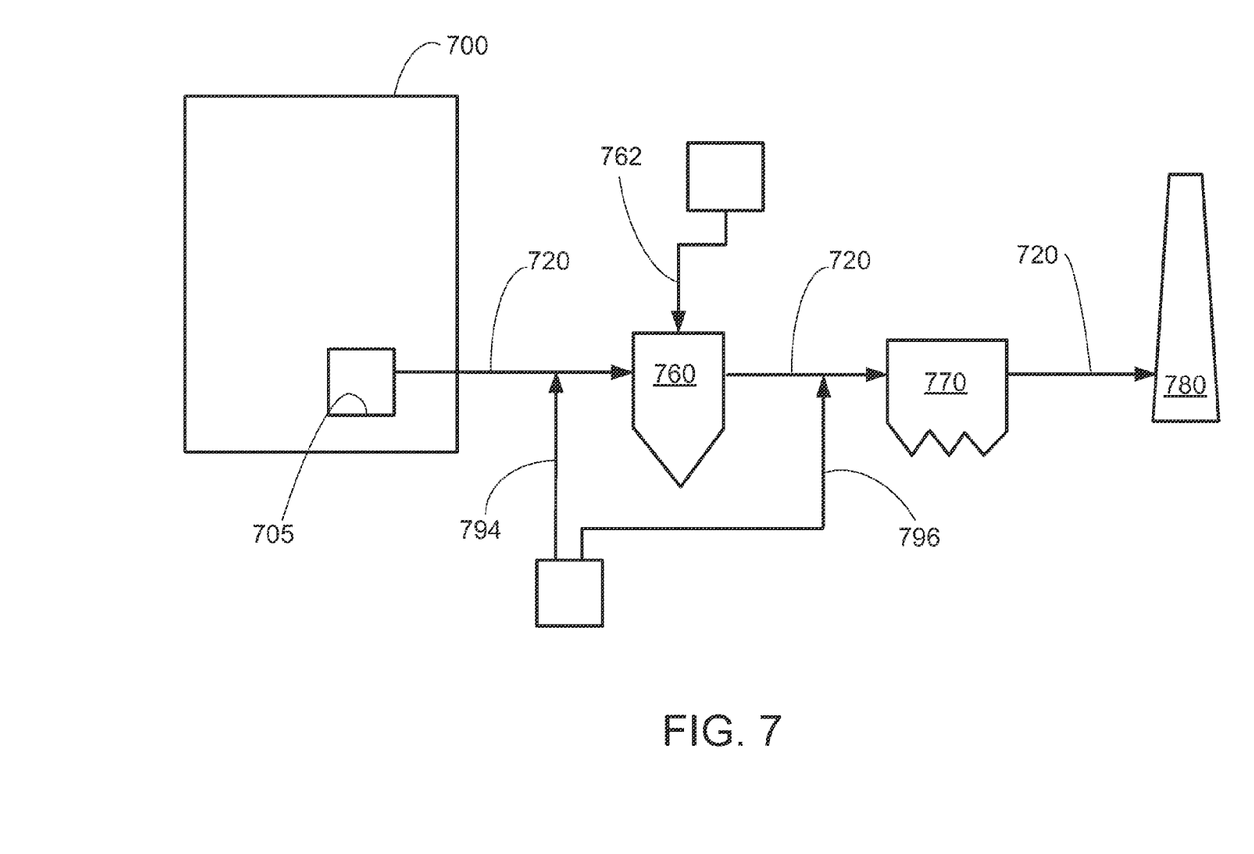
FIG. 7 is a general process diagram illustrating the methods of the present disclosure.

Typically, it is more desirable to inject the calcium hydroxide powder upstream of the spray dryer absorber 260 (i.e. injection locations A or B) because the spray dryer absorber helps to properly disperse the powder throughout the baghouse 270. FIG. 4 is a cutaway view of a spray dryer absorber 400 typically used in desulfurization systems. The spray dryer absorber typically has a housing 410 with a frustoconical shape, with the apex of the cone at the bottom of the absorber. However, spray dryer absorbers may also have a flat bottom instead of the cone. The flue gas 420 coming from the air heater can be split into two streams 422, 424, although this is not always the case and is not necessary for the present disclosure. One stream 422 is directed to an upper gas disperser 430 which has an annular shape. The other stream 424 is directed to a lower gas disperser 440. The atomizer 450 extends through the center of the roof of the absorber housing, and sprays the lime slurry into the flue gas. The flue gas enters the spray dryer absorber 400 through the gas dispersers. The spray dryer absorber is designed to assure good mixing of the flue gas with the slurry, and is sized to provide sufficient residence time for drying the slurry to produce free-flowing solids without internal deposits. With regards to startup though, the mixing and turbulence imparted to the calcium hydroxide powder by the spray dryer absorber assures better dispersion of the calcium hydroxide throughout the filter bags in the baghouse. Water is added into the spray dryer absorber by the atomizer 450 to the dry calcium hydroxide powder to form a calcium hydroxide slurry. The water is not necessarily completely evaporated, especially at the lower temperatures, and is needed in the baghouse for the filter cake to attain its full desulfurization ability since the reaction mechanism for $SO_2$ absorption requires the presence of molecular water. The evaporated calcium hydroxide slurry exits the spray dryer absorber through outlet 460 and proceeds to the baghouse.

FIG. 5 is a schematic diagram of a typical dry sorbent injection system for hydrated lime. Hydrated lime can either be delivered 510 by truck or by rail (truck unloading is illustrated here). Ambient air 512 is drawn into the truck to pick up the hydrated lime and transfer the reagent to a storage silo 520. The reagent flows from the storage silo 520 through a series of valves 522, feeders 524, and hoppers 526, 528 into a rotary airlock 530 where the reagent is mixed with the transport gas 540 to be pneumatically conveyed to the injection location into the gas flowpath (see FIG. 2). The transport gas, typically air, is provided by transport air blowers 542 that pass the transport gas through air coolers 544 to reduce the air temperature to prevent premature calcination of the reagent. It should be noted that in the present system, no liquids are injected into the gas flowpath between the injection location and the spray dryer absorber. This is in contrast to prior systems where solutions and slurries have been injected into the flue gas upstream of a wet or dry scrubber; see for example U.S. Pat. No. 6,126,910 to Wilhelm. This is also in contrast to a system where a dry calcium sorbent has been injected and then humidified with water in ductwork; see for example U.S. Pat. No. 5,165,903 to Hunt. In these prior systems, the desired purpose is to remove selected pollutants from the flue gas before entering the desulfurization system. In contrast, the purpose of the present methods is to provide an alternate source of alkali reagent (hydrated lime), increase hydrated lime concentration in the spray dry absorber and to coat the baghouse with calcium hydroxide in order to provide desulfurization and enhanced desulfurization capability. Adding water or liquid before the spray dryer absorber may result in the undesirable condition of calcium hydroxide falling out of the gas and failing to travel to the baghouse.

The methods of the present disclosure improve the capability of the desulfurization system to respond to and operate within acceptable acid gas emissions levels by providing a means to react in a timely manner to variations in emissions levels. One recurring theme in maintaining combustion system operations is the time needed to fix a given problem. Calcium hydroxide powder can be quickly added and a good response is obtained. The methods also provide a dry sorbent that does not require adding water to the process.

FIG. 7 is a general process diagram illustrating the methods of the present disclosure. A combustion system 700 contains a combustion chamber 705 in which combustion occurs and results in the generation of a flue gas. The flue gas travels along a gas flowpath 720 through a spray dryer absorber 760 to a baghouse 770 downstream of the spray dryer absorber. Dry calcium hydroxide powder is mixed with the flue gas (in the gas flowpath 720) between the combustion chamber 705 and the baghouse 770. For example, the calcium hydroxide powder can be added upstream of the spray dryer absorber (reference numeral 794) or downstream of the spray dryer absorber (reference numeral 796). Inside the spray dryer absorber 760, water (reference numeral 762) is sprayed into the flue gas to humidify and cool the flue gas. The flue gas is passed to the baghouse 770. The calcium hydroxide captures pollutants or particulates in the flue gas. The cleaned flue gas is sent to a stack 780 or similar device for release into the atmosphere.

Designs for practicing the methods of this disclosure are within the ordinary skill of the art. The valves, piping, sensors, connections, and fittings needed to permit the practice of these methods are also generally commercially available.

EXAMPLE

A 120 MWg (gross megawatts) power plant had the layout seen in FIG. 2. The use of calcium hydroxide powder was implemented during startup and as a replacement for lime slurry. The calcium hydroxide powder was injected at injection locations A and C. Actual stack $SO_2$ emissions are shown in FIG. 6. The y-axis is the amount of $SO_2$ emitted, in units of lb/MBtu (pounds per million BTUs). The x-axis is the time of day, i.e. from midnight (0:00) to 12:00 pm. The regulated stack $SO_2$ emission limit of 0.09 lb/MBtu is shown for reference. Two lines are shown: one for the actual emissions and one for the estimated emissions if calcium hydroxide powder had not been injected. It should be noted that startup was attempted three times on this figure: at about 12:30 am, about 2:45 am, and about 5:45 am.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method for reducing combustion emissions produced during non-steady state operating conditions in a combustion system having a gas flowpath that travels from a combustion chamber through a spray dryer absorber to a baghouse downstream of the spray dryer absorber, the method comprising:

mixing a dry calcium hydroxide powder into a carrier gas in the gas flowpath at an injection location downstream of the combustion chamber and upstream of the baghouse;

spraying water into the carrier gas in the spray dryer absorber to humidify and reduce the temperature of the carrier gas; and depositing the calcium hydroxide powder in the baghouse to form a filter cake that reduces combustion emissions.

2. The method of claim 1, wherein no liquid is added to the carrier gas between the injection location and the spray dryer absorber.

3. The method of claim 1, wherein the water sprayed into the carrier gas comes from a recycle system for recycling solids from the baghouse.

4. The method of claim 1, wherein the gas flowpath travels through an air preheater located between the combustion chamber and the spray dryer absorber.

5. The method of claim 4, wherein the injection location is located between the air preheater and the spray dryer absorber.

6. The method of claim 4, wherein the injection location is upstream of the air preheater.

7. The method of claim 4, further comprising a particulate collection device between the air preheater and the spray dryer absorber.

8. The method of claim 7, wherein the injection location is downstream of the particulate collection device.

9. The method of claim 1, wherein the injection location is between the spray dryer absorber and the baghouse.

10. The method of claim 1, wherein the baghouse is a pulse jet fabric filter, a shake deflate fabric filter, or a reverse gas fabric filter.

11. The method of claim 1, wherein the water sprayed in the spray dryer absorber is sprayed through auxiliary nozzles, and an atomizer of the spray dryer absorber is not operating.

12. The method of claim 1, wherein the carrier gas entering the spray dryer absorber has a temperature of from about 140° F. to about 210° F.

13. The method of claim 1, wherein the carrier gas entering the spray dryer absorber has a temperature of from less than 220° F.

14. The method of claim 1, wherein the combustion chamber has a temperature of less than 400° F.

15. The method of claim 1, wherein the carrier gas is flue gas exiting the combustion chamber during startup of the combustion chamber.

16. The method of claim 1, wherein the temperature of the carrier gas is decreasing over time.

17. The method of claim 1, wherein the non-steady state operating condition is a malfunction along the gas flowpath.

18. The method of claim 1, wherein the combustion system is selected from the group consisting of boilers, kilns, furnaces, smelters, roasters, batteries, heaters, ovens, and incinerators.

19. A method for capturing pollutants in a flue gas produced by a combustion chamber during non-steady state operating conditions, the method comprising:

mixing a dry calcium hydroxide powder into the flue gas at an injection location downstream of the combustion chamber and upstream of a spray dryer absorber;

spraying water into the flue gas in the spray dryer absorber to humidify and reduce the temperature of the flue gas; and passing the flue gas through a baghouse downstream of the spray dryer absorber, wherein the calcium hydroxide powder is deposited in the baghouse to form a filter cake that captures pollutants in the flue gas.

20. The method of claim 19, wherein no liquid is added to the flue gas between the injection location and the spray dryer absorber.

21. The method of claim 19, wherein the flue gas entering the spray dryer absorber has a temperature of from about 140° F. to about 210° F.

22. The method of claim 19, wherein the flue gas entering the spray dryer absorber has a temperature of from less than 220° F.

23. The method of claim 19, wherein flue gas exiting the combustion chamber has a temperature of less than 400° F.

24. The method of claim 19, wherein the combustion chamber is located in a combustion system selected from the group consisting of boilers, kilns, furnaces, smelters, roasters, batteries, heaters, ovens, and incinerators.

* * * * *